Patented Apr. 6, 1948

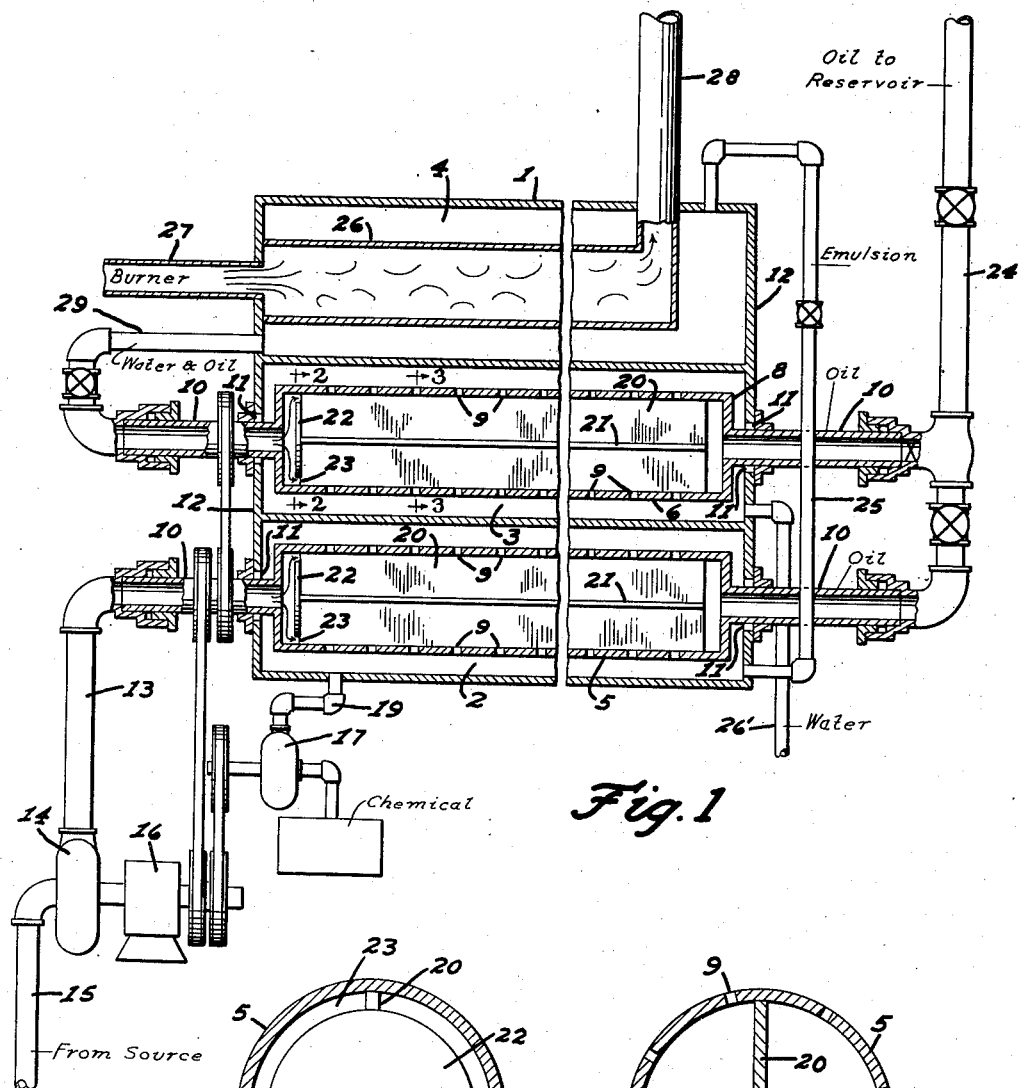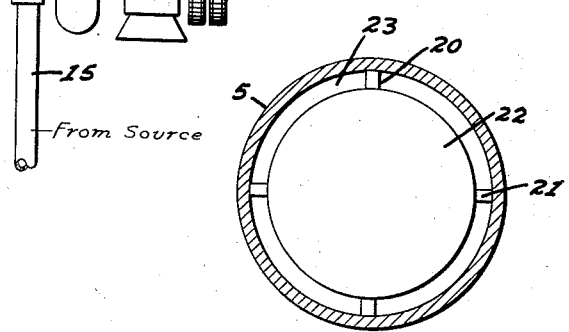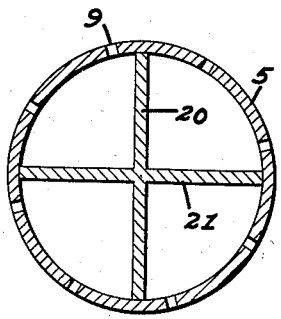

2,439,177

UNITED STATES PATENT OFFICE 2,439,177

APPARATUS FOR DEHYDRATION OF OIL

Lester C. Manning, Oklahoma City, Okla., assignor to Ralph L. Senter, Oklahoma City, Okla.

Application January 25, 1946, Serial No. 643,434

7 Claims. (Cl. 252—347)

This invention relates to the dehydration of oil, particularly crude oil in which the water is present in the form of an emulsion.

The subject invention purports to be an improvement over the known methods which involve heating the entire oil body to break down the emulsion which constitutes only a small part of the entire oil body, or which separate the emulsion from the body of oil by centrifuging and then discard the emulsion including its appreciable content of recoverable oil.

The known heating method is uneconomical, in that it heats all the oil in order to get heat to the small percentage of emulsion in the oil, resulting in degrading the oil through permanent lowering of its viscosity, and when chemical is used adjunctive to the heat, enough chemical must be employed to treat all of the oil to get chemical to the small proportion that needs treatment.

The conventional method of centrifugal separation is wasteful, in that the discarded emulsion contains about 40% oil.

The subject invention has for its general object the provision of a method of dehydrating oil, which involves preliminary centrifugal separation of the oil and emulsion, the chemical treatment of the emulsion only, the heating of the emulsion only, by which it is broken down into oil and water, and finally, the centrifugal separation of the water and oil constituents of the emulsion. This method results in the conservation of all the oil, the major portion being segregated in the preliminary separation step without further treatment, and the minor portion in the treatment solely of the emulsion, involving the minimum use both of chemical and heat.

Another object of the invention is the provision of apparatus for carrying out the above method in continuous sequence.

Other objects of the invention will appear as the following description of a preferred and practical embodiment thereof proceeds.

In the drawing which accompanies this specification, forming part thereof:

Figure 1 is a vertical section largely diagrammatic, illustrating the apparatus of the invention;

Figure 2 is a cross-section taken along the line 2—2 of Figure 1;

Figure 3 is a cross-section taken along the line 3—3 of Figure 1.

Referring now to the details of construction, the numeral 1 represents a casing divided into three fluid tight compartments 2, 3 and 4. These are shown in vertical tiered arrangement, but their relative location is not vital to the invention. The compartments 2 and 3 each enclose a centrifugal drum 5 and 6, rotatable upon horizontal axes. These drums may be identical, each comprising a tubular member having closed ends 7 and 8, and having peripheral perforations 9 communicating with the compartment chambers outside of the drums. Each drum has an axial tubular shaft 10 extending from opposite ends journaled in bearings 11 in the end walls 12 of the said compartments. One of the shafts 10 of the lower centrifugal drum 5 is in communication with the eduction pipe 13 of a pump 14, which draws crude oil by way of the induction pipe 15 from the well or other source, and by which pump it is delivered to the lefthand end of the centrifugal drum 5. This oil contains water in the form of an emulsion.

The pump 14 is driven by a motor 16, which through belt and pulley connections also drives both of the centrifugal drums. The motor 16 is also operatively connected to a chemical pump 17, which draws liquid chemical from the tank 18 and delivers it to the compartment 2 by way of the pipe 19.

Each of the centrifugal drums 5 and 6 is provided with the longitudinal perpendicular baffles 20 and 21, intersecting along the longitudinal axes of the drums and extending throughout the major portion of the length of said drums, terminating short of the ends of said drums. Said baffles are fixed to the drums so as to rotate therewith. At the inlet end of each drum is a coaxial circular baffle 22, positioned against the ends of the longitudinal baffles 20 and 21, and being of smaller diameter than the interior diameter of the drums, so as to provide an annular peripheral space 23. The middle portion of the baffles 22 confronts the openings of the adjacent tubular shafts 10.

The oil and emulsion pumped into the rotating centrifugal drum 5 at the lefthand end thereof strikes the baffle 22 and is diverted peripherally so that the entire body of oil, including the emulsion, is first brought against the peripheral inner surface of the drum, where the emulsion is subjected to maximum centrifugal force and driven through the apertures 9 into the outer chamber of the compartment 2. The object of the baffles 22 is to prevent any of the emulsion from traveling longitudinally adjacent the axis of the drum where centrifugal force is at a minimum value, and thus assures that all the emulsion will be expelled from the drum in its course of traverse through the drum. The purpose of the baffles 20 and 21 is to cause the oil body to rotate with the drum and thus generate centrifugal force in the body of oil instead of letting the drum slip relatively to the oil, as would be the case in the absence of these baffles. The major portion of the oil thus separated from the mixture of oil and emulsion passes out through the tubular shaft 10 at the righthand end of the drum 5 and through the communicating pipe 24 direct to a storage reservoir, not shown, without further treatment. The emulsion occupies the chamber of the compartment 2 outside of the drum 5. Chemical from the pipe 19 is mixed with the emulsion in this compartment chamber, the mixing being promoted by agitation created by the rotation of the drum 5 and the jets of emulsion issuing from the perforations 9. The invention is not restricted to the use of any particular chemical. Those generally used are such as reverse the phase of the emulsion and may include water soluble salts such as sodium chloride or sodium sulfate, water soluble soaps such as the sodium salts of fatty acids, or sulfonated fatty acids. The emulsion is progressively moved by the pressure of the pump 14 toward the righthand end of the compartment 2, being discharged through the pipe 25 into the upper compartment 4, which is a heating chamber. Since the emulsion and chemical is forced to flow through the restricted bore of said pipe, a further intimate mixing of the emulsion and chemical is thereby effected.

The upper compartment 4 contains a fire box 26 extending longitudinally through the major portion of the length of said compartment, and being of smaller cross-section than that of said compartment and spaced from the walls thereof to provide a chamber surrounding said fire box. A burner 27 communicates with the fire box at its lefthand end, while the opposite end terminates in a flue 28, extending through the upper wall of the compartment 4, through which the products of combustion are discharged.

The emulsion inlet pipe 25 communicates with one end of the compartment 4, preferably near the top, and a discharge pipe 29 for the liquid constituents of the broken down emulsion communicates with the opposite end of the compartment 4. Thus, the pressure of the pump 14 causes a progressive flow of emulsion from one end of the compartment 4 to the other about the fire box 26. In the course of its flow, the emulsion is heated and at some intermediate point it breaks down into its constituents, water and oil. Both of these constituents are discharged through the pipe 29, and enter the centrifugal drum 6 at its lefthand end through the adjacent tubular shaft 10 with which the pipe 29 communicates. Here the oil and water are together diverted peripherally by the circular baffle 22, the water being forced to travel close to the periphery of the drum 6, so that it is expelled through the perforations 9 by centrifugal force and none of it permitted to travel close to the axis of the drum where centrifugal force has a substantially nil value. Complete separation of the water from the oil is effected in the drum 6, the water being expelled into the chamber of the compartment 3, while the oil is discharged through the tubular shaft 10 at the righthand end of said drum into the pipe 24 and to the oil storage reservoir. The water in the outside chamber of the compartment 3 discharges by way of the waste pipe 26'.

Thus, it will be understood that the main body of oil is separated from the emulsion by the centrifugal drum 5 and the oil carried to storage without further treatment, that the chemical is added only to the emulsion in the outer chamber of the compartment 2, only enough being required to treat said emulsion, that only the emulsion is subjected to heat in the compartment 4, only sufficient heat being required to treat the relatively small proportion of emulsion, and that all of the oil content of the emulsion is separated by the centrifugal drum 6 and returned to storage. By the avoidance of heating the main body of oil, its high viscosity is not impaired, and its value thereby maintained.

While dimensions are of course not vital to the patentability of an invention, and this apparatus may be built to any desired size, it may be stated that a practical embodiment of this apparatus has been built in which the centrifugal drums are 12 feet long, 6 inches in diameter and rotated at a speed of 3000 R. P. M. Such apparatus is adaptable either for permanent installation or as a portable unit.

While I have in the above disclosure described what I believe to be a preferred and practical embodiment of the invention, it will be understood by those skilled in the art that the details of construction and arrangement of parts as shown, are by way of example and not to be construed as limiting the scope of the invention.

What I claim as my invention is:

1. Apparatus for dehydrating oil in which the water is present in emulsion with a portion of the oil, comprising, a preliminary centrifuge and a final centrifuge, each consisting of a hollow rotatable drum having a perforated periphery and tubular coaxial shafts extending from the ends of said drum communicating with the interior chamber thereof, and fluid-tight casings surrounding said drums in spaced relation thereto defining therewith exterior chambers with which the perforations in the respective drums communicate, said shafts being journaled in bearings in opposite walls of the respective casings, a heater comprising a fire box and a fluid-tight casing surrounding said fire box in spaced relation thereto defining therewith a heating chamber, conduits serially connecting one end of the exterior chamber of said preliminary centrifuge with one end of said heating chamber and the opposite end of said heating chamber with one of the shafts of the drum of said final centrifuge, a conduit connected to one of the shafts of the drum of said preliminary centrifuge adapted to communicate with a source of oil, a pump in said last named conduit pumping towards said last named drum, means for driving said pump and drums, the opposite shafts of the respective drums being discharge outlets for oil, and a water discharge outlet from the exterior chamber of said final centrifuge.

2. Apparatus as claimed in claim 1, including means for supplying chemical to the exterior chamber of said preliminary centrifuge.

3. Apparatus as claimed in claim 1, including a longitudinal baffle carried by each drum for compelling the fluid within said drum to rotate therewith.

4. Apparatus as claimed in claim 1, including a longitudinal baffle carried by each drum in an axial plane for compelling the fluid within said drum to rotate therewith, and a baffle adjacent the inlet end of each drum arranged transversely of the axis thereof and sized to define a narrow space between itself and the peripheral wall of said drum, directing the incoming fluid to flow close to the perforated periphery of said drum.

5. Apparatus for dehydrating oil in which water is present in emulsion with a portion of the oil comprising, a fluid-tight casing divided into a plurality of tubular chambers, a fire box in one of said chambers spaced from the surrounding chamber walls forming a heating chamber, a hollow rotatable drum having a perforated periphery and tubular coaxial shafts extending from the ends of said drum communicating with the interior of the drum in each of said other two tubular chambers, the drums being spaced from the surrounding chamber walls defining with said walls exterior chambers with which the perforations of the drum communicate and having their shafts journaled in the respective chamber end walls defining preliminary and final centrifuges, conduits serially connecting one end of the exterior chamber of said preliminary centrifuge with one end of said heating chamber and the opposite end of said heating chamber with one of the shafts of the drum of said final centrifuge, a conduit connected to one of the shafts of the drum of said preliminary centrifuge adapted to communicate with a source of oil, a pump in said last named conduit pumping towards said last named drum, means for driving said pump and drums, the opposite shafts of the respective drums being discharge outlets for oil, and a water discharge outlet from the exterior chamber of said final centrifuge.

6. Apparatus as claimed in claim 5, including means for supplying chemical to the exterior chamber of said preliminary centrifuge.

7. In apparatus for dehydrating oil in which water is present in emulsion with a portion of the oil, a centrifuge comprising, a hollow rotatable drum having a perforated periphery and tubular coaxial shafts extending from the ends of said drum communicating with the interior chamber thereof, a fluid-tight casing surrounding said drum in spaced relation thereto defining therewith an exterior chamber with which the perforations in the drum communicate, said shafts being journaled in bearings in opposite walls of the casing, a longitudinal baffle carried by the drum for compelling fluid within said drum to rotate therewith, and a baffle adjacent the inlet end of each drum arranged transversely of the axis thereof and sized to define a narrow space between itself and the peripheral wall of said drum, directing the incoming fluid to flow close to the perforated periphery of said drum.

LESTER C. MANNING.

REFERENCES CITED

The following references are of record in the file of this patent:

UNITED STATES PATENTS

| Number | Name | Date |
| --- | --- | --- |
| 1,370,326 | Leitch | Mar. 1, 1921 |
| 1,373,773 | Sharples | Apr. 5, 1921 |
| 1,500,202 | Petty | July 8, 1924 |
| 1,696,859 | Palmer | Dec. 25, 1928 |
| 2,365,256 | Edvarsson | Dec. 19, 1944 |